United States Patent [19]
Lee

[11] Patent Number: 5,748,835
[45] Date of Patent: May 5, 1998

[54] AUDIO SIGNAL DECODING APPARATUS AND METHOD FOR A DISC DRIVING SYSTEM

[75] Inventor: Hee-Soo Lee, Ahnsan, Rep. of Korea

[73] Assignee: Samsung Electronics Co., Ltd., Kyungki-do, Rep. of Korea

[21] Appl. No.: 689,156

[22] Filed: Jul. 30, 1996

[30] Foreign Application Priority Data

Sep. 29, 1995 [KR] Rep. of Korea .................. 1995 33089

[51] Int. Cl.$^6$ .............................. H04N 5/91; H04N 5/928
[52] U.S. Cl. ................................... 386/104; 386/97
[58] Field of Search .................... 386/46, 95, 96, 386/97, 98, 99, 101, 104, 105, 106, 109, 112, 124, 125, 126; 381/17, 18, 19, 20, 21, 22, 23; H04N 5/91, 5/928

[56] References Cited

U.S. PATENT DOCUMENTS

4,807,060  2/1989  Takahashi et al. ...................... 386/104
4,958,246  9/1990  Kozuki et al. ............................ 386/102

Primary Examiner—Robert Chevalier
Attorney, Agent, or Firm—Sughrue, Mion, Zinn, Macpeak & Seas, PLLC

[57] ABSTRACT

In an apparatus and method for reproducing digital audio data recorded onto a disc, the apparatus includes a first switching unit for outputting an audio signal of the AC-3 format to a first output port, for outputting an audio signal of the MPEG2 format to a second output port and for outputting a PCM audio signal to a third output port, an AC-3 decoding unit for extending input compressingly encoded 6-channel audio data of the AC-3 format and then restoring the same into 6-channel audio data, an MPEG2 decoding unit for extending input compressingly encoded audio data of the MPEG2 format and then restoring the same into 6-channel audio data, a PCM processing unit for audio-field processing input 2-channel linear PCM audio data and then converting the same into 6-channel audio data, a second switching unit for selectively outputting audio signals of the first through third input ports to an output port, a unit for converting and outputting input audio data into analog audio signal, and a unit having six speakers for reproducing the 6-channel analog signal.

7 Claims, 5 Drawing Sheets

Fig. 1

PRIOR ART

Fig. 2

PRIOR ART

AUDIO SIGNAL DECODING APPARATUS AND METHOD FOR A DISC DRIVING SYSTEM

BACKGROUND OF THE INVENTION

1. Field of the Invention

The present invention relates to an apparatus and method for reproducing digital audio data recorded onto a disc, and more particularly, to an apparatus and method for processing two-channel digital audio data into a six-channel audio signal and reproducing the same.

The present application for an apparatus and method for reproducing digital audio data recorded onto a disc, is based on Korean Application No. 33089/1995 which is incorporated herein by reference for all purposes.

2. Description of the Related Art

To advance the development of video and audio systems, it is necessary to provide improved picture and sound quality. Improved sound quality is provided by a system which reproduces a multi-channel signal of five or six audio channels from a two-channel stereo signal. Also, in accordance with the development of signal processing technology, a variety of methods for coding an audio signal have been proposed.

Figure 1:
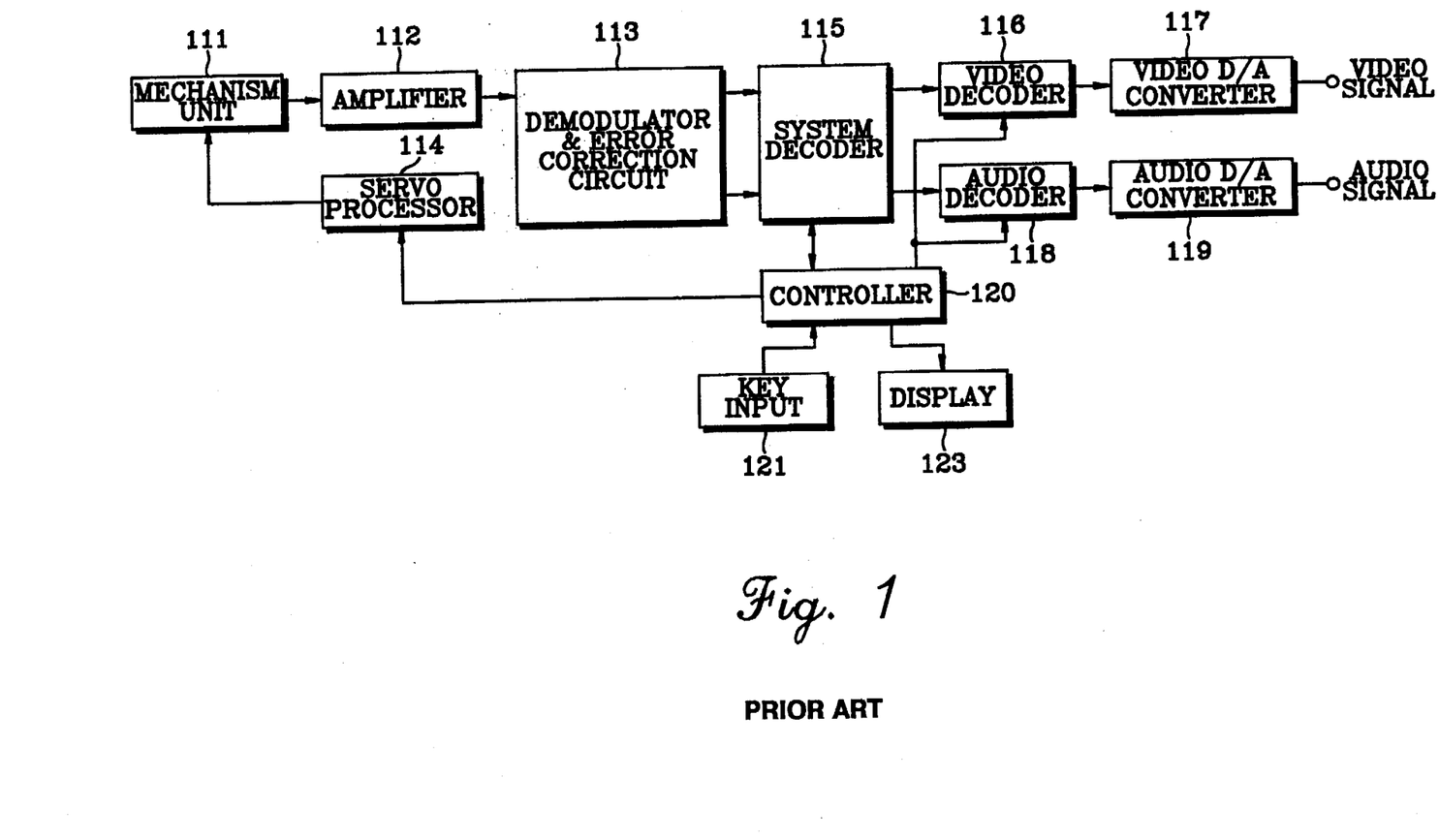
FIG. 1 is a block diagram of a digital video disc driving system.

FIG. 1 is a block diagram of a digital video disc player (DVD) system, in which a mechanism unit 111 includes a pickup unit and a deck and reads information recorded on a disc to generate a radio frequency (RF) signal.

An amplifier 112 amplifies and outputs the RF signal of a fine state output of the mechanism unit 111.

A servo processor 114 controls the mechanism unit 111 under the control of a controller 120. The servo processor 114 outputs a focusing signal and a tracking signal so that the mechanism unit 111 reads the information recorded onto the disc exactly.

A key input 121 generates various key signals for performing system operations and modes. The controller 120 controls the overall operation of the DVD system according to the key signals generated in the key input 121 and input system information. Also, the controller 120 generates a servo control signal for controlling the operation of the servo processor 114.

A demodulator & error correction circuit 113 digitally converts, de-interleaves, demodulates and error-corrects the RF signal from the amplifier 112 and outputs the same as a bit stream.

A system decoder 115 receives the bit stream information output from the demodulator & error correction circuit 113, analyzes the received information and filters and outputs the same as video information, audio information and system information. Here, the video information output from the system decoder 115 is data encoded in a Moving Picture Expert Group (MPEG) 2 format. Also, the audio information is data formatted in an AC-3 frame or encoded in the MPEG or pulse code modulation (PCM) format.

A video decoder 116 decodes the video information of the MPEG 2 format output from the system decoder 115 and outputs video data.

A video digital to analog converter 117 converts the video data output from the video decoder 116 into an analog video signal and outputs the same.

An audio decoder 118 controlled by an audio mode control signal of the controller 120 encodes the encoded audio data output from the system decoder 115 in the corresponding method and outputs the same. Therefore, the audio decoder 118 includes a unit for decoding the AC-3 encoded data, MPEG2 encoded data and PCM data into original data, and the corresponding units are activated by the audio mode control signal of the controller 120 to decode input encoded data.

An audio digital-to-analog converter 119 converts the decoded audio data output from the audio decoder 118 into an analog signal and outputs the same. Here, the audio signal includes a voice signal, a musical signal, an acoustic signal, etc.

Figure 2:
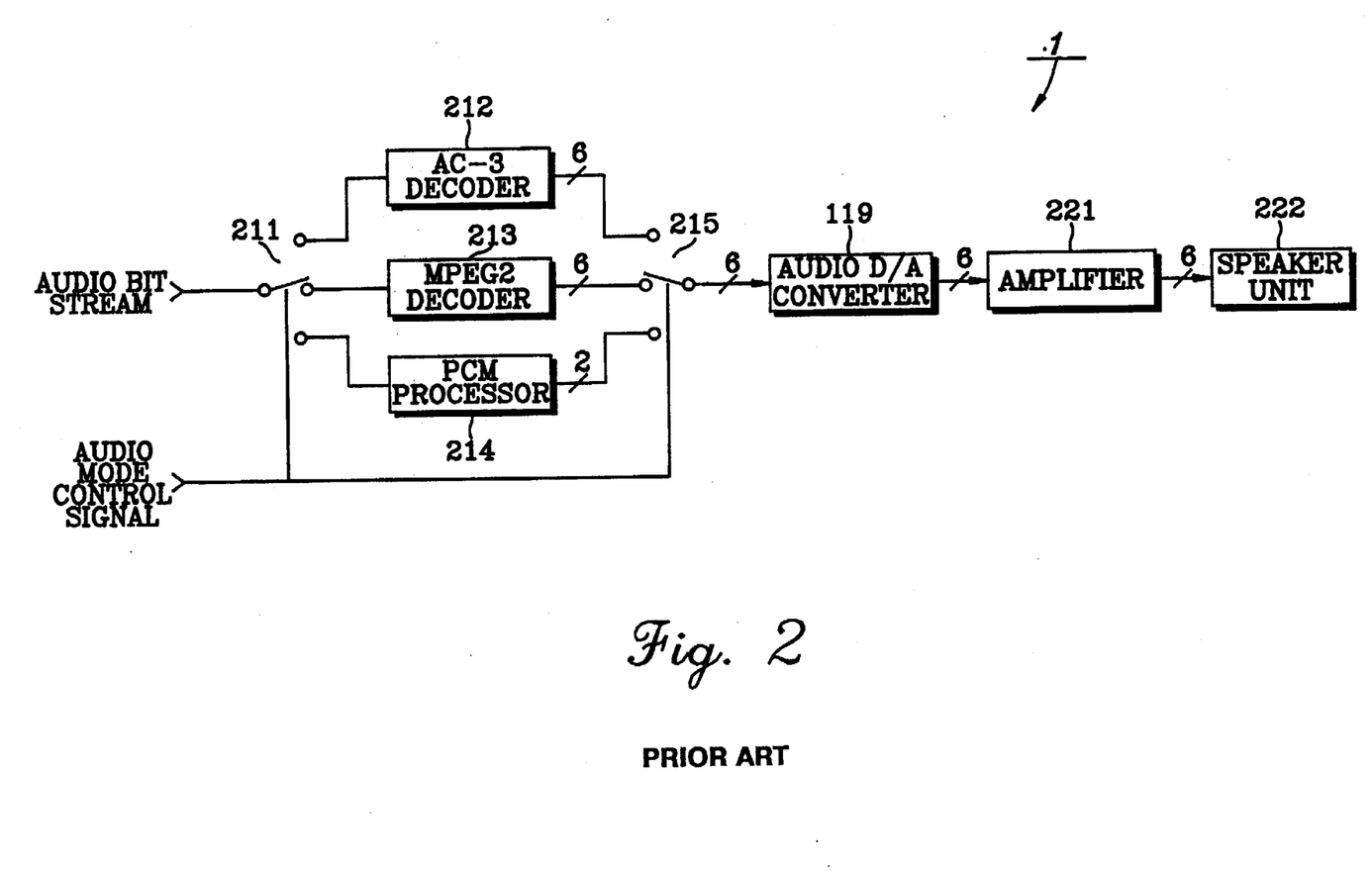
FIG. 2 is a block diagram of a conventional audio decoder in FIG. 1.

FIG. 2 shows the structure of the audio decoder 118 in FIG. 1, which includes a first switch 211 whose input port is connected to the audio bit stream output from the system decoder 115 and whose control port is connected to the audio mode control signal output from the controller 120. Also, the first output port of the first switch 211 is connected to the input port of the AC-3 decoder 212, and the second output port thereof is connected to the input port of the MPEG2 decoder 213, and the third output port thereof is connected to the input port of the PCM processor 214. Therefore, the first switch 211 switches the audio bit stream input by the audio mode control signal and outputs the same to the corresponding decoders 212 through 214. The first switch 211 may be implemented by a multiplexer. In this case, the audio mode control signal applied as the selection signal of the multiplexer is a 2-bit signal.

The AC-3 decoder 212 extends the data encoded by the, AC-3 compression format output from the first output port of the first switch 211 into the original data and outputs the same as 6-channel audio data. The MPEG2 decoder 213 extends the data encoded by the MPEG2 audio format output from the second output port of the first switch 211 into the original data and outputs the same as 6-channel audio data. The PCM processor 214 filters and outputs the linear PCM audio data output from the third output port of the first switch 211 into 6-channel data. Here, the 6-channel audio signal includes a low frequency enhancement (LFE) channel audio signal, center (C) channel audio signal, left (L) channel audio signal, right (R) channel audio signal, left surround (LS) channel audio signal, and right surround (RS) channel audio signal. Also, the 2-channel audio signal includes a left (L) channel audio signal and a right (R) channel audio signal.

The first input port of the second switch 215 is connected to the output port of the AC-3 decoder 212, the second input port thereof is connected to the output port of the MPEG2 decoder 213, and the third input port thereof is connected to the output port of the PCM processor 214. The second switch 215 switches the audio signal applied to the first through third input ports by the audio mode control signal output from the controller 120 and selectively outputs the switched signal to the output port thereof.

In FIG. 2, the AC-3 decoder 212 inputs the bit stream read from the disc where the 6-channel audio signal is compressingly recorded in the AC-3 format and restores the input bit stream into the original 6-channel audio signal. The compressing and extending method in the AC-3 format complies with the "AC-3" format proposed by the Dolby Laboratories (see AC-3 standard book by the Dolby Lab.). At this time, the bit stream includes additional information such as system information (header data) as well as pure audio information. These kinds of data are filtered or controlled by the AC-3 decoder 212 as well.

In FIG. 2, the MPEG2 decoder 213 extends the audio stream information proposed by the MPEG into the original 6-channel audio signal and its basic operation is similar to that of the AC-3 decoder 212. However, since the formats of the bit steam are different from each other, separate blocks are required. Here, such a bit stream data structure complies with "ISO/IEC 13818-3".

Figure 3:
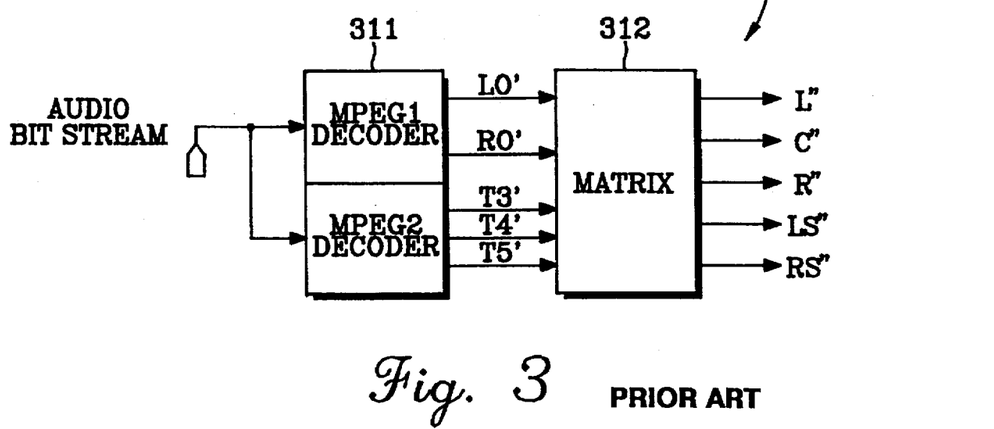
FIG. 3 is a block diagram of an MPEG2 audio decoder in FIG. 2.

FIG. 3 illustrates a basic concept of the MPEG2 decoder 213, which is disclosed in "MPEG1 and MPEG2 Audio Coding Algorithms and Implementation" by L. M. van de Kerkhof and B. Gall C. Vandenvulcke, 1994 IEEE.

Figure 4:
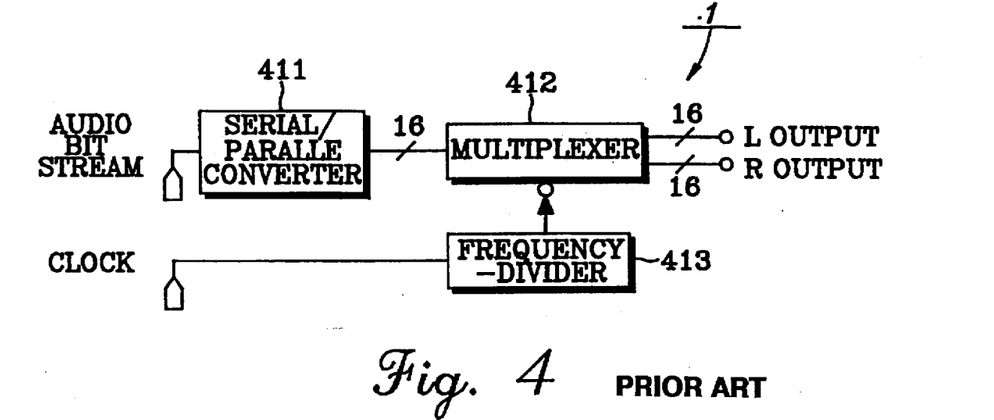
FIG. 4 is a block diagram of a PCM processor for processing a PCM audio signal in FIG. 2.

In FIG. 2, the PCM processor 214 may be constructed as shown in FIG. 4. In other words, the bit stream of the PCM audio has a structure that 16-bit audio data of the L channel and 16-bit audio data of the R channel are seriated. Thus, a serial-to-parallel converter 411 converts the linear PCM audio data of the input bit stream format into the 16-bit parallel linear PCM audio data. A frequency-divider 413 frequency-divides a bit clock to generate a selection signal converted in a 16-bit cycle. Then, a multiplexer 412 selectively outputs the L-channel audio data and the R-channel audio data from the parallel linear PCM audio data by the selection signal output from the frequency-divider 413. Therefore, the PCM processor 214 receives the linear PCM data composed of L and R channels, filters such data into the L- and R-channel data and outputs the same.

Figure 5:
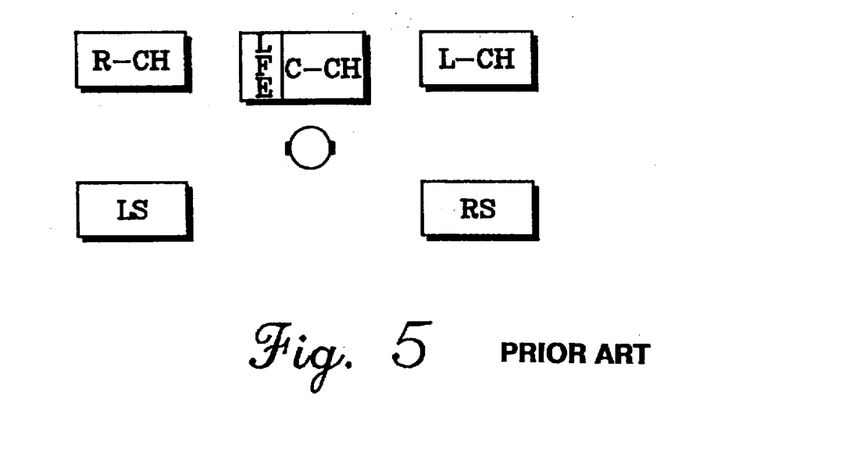
FIG. 5 illustrates arrangement of speakers when an audio signal is reproduced in the disc driving system shown in FIG. 1.

As described above, the DVD system processes the 6- or 2-channel audio signal in accordance with a compressingly encoding method used in recording and reproducing the audio signal. At this time, the speakers of the DVD system are arranged in the same way as that shown in FIG. 5. Therefore, when the DVD system reproduces a disc recorded by compressingly encoding using the AC-3 or MPEG2 format, six speakers arranged as shown in FIG. 5 are all operated to reproduce the audio signal. However, when the audio data encoded using the PCM format is reproduced, only the 2-channel audio signal is reproduced via the L-channel speaker and R-channel speaker among six speakers.

However, in reproducing the audio signal by the DVD system, during the PCM mode, since the PCM data reproduced from the disc is composed of L- and R-channel audio data, only the audio signals for 2 channels are reproduced, among six reproducible channels, that is, the maximum reproducing function of the audio signal is not realized.

Also, the audio decoder 118 may be implemented by either hardware using logic circuits or software using chips of a digital signal processor (DSP). In case of implementing the audio decoder 118 using the DSP, the processing quantity is small during the PCM mode, so that the performance of the DSP chips cannot be fully realized.

SUMMARY OF THE INVENTION

Therefore, it is an object of the present invention to provide an apparatus and method of reproducing a 2-channel audio signal by extending the channels.

It is another object of the present invention to provide an apparatus and method of reproducing a PCM audio signal recorded in 2 channels in a digital video disc player for reproducing a 6-channel audio signal by audio-field processing the same.

To accomplish the above objects, there is provided an audio field processor for extending channels of a PCM audio data composed of first and second channels of a stereo signal, the audio field processor comprising: a unit for receiving an audio data stream, filtering first and second channel data from the audio data stream and outputting the same; a unit for adding the first and second channel audio data; a unit for subtracting the second channel audio data from the first channel data; a unit for lowpass-filtering the added data to a first frequency or below and generating a third channel audio signal; a unit for bandpass-filtering the added data from the first frequency to a second frequency of an audible band and generating a fourth channel audio signal; a unit for delaying the subtracted data by a predetermined time and generating audio signals of fifth and sixth channels; and a unit having six speakers for reproducing the first through sixth channel audio signals.

DETAILED DESCRIPTION OF THE PREFERRED EMBODIMENT

Hereinbelow, a preferred embodiment of the present invention will be described in detail with reference to the accompanying drawings. It should be noted that among those drawings, the same elements are represented by the same reference numerals or letters.

Here, a first channel represents a left (L) channel, a second channel represents a right (R) channel, a third channel represents a low-frequency enhancement (LFE) channel, a fourth channel represents a center (C) channel, a fifth channel represents a left surround (LS) channel and a sixth channel represents a right surround (RS) channel.

The system for performing the present invention has the same structure of the DVD shown in FIG. 1 and has the same reference numerals for the corresponding parts. In other words, an audio field processor for extending a PCM audio signal of two channels non-compressed into a 6-channel audio signal, and may be adapted to the DVD.

Figure 6:
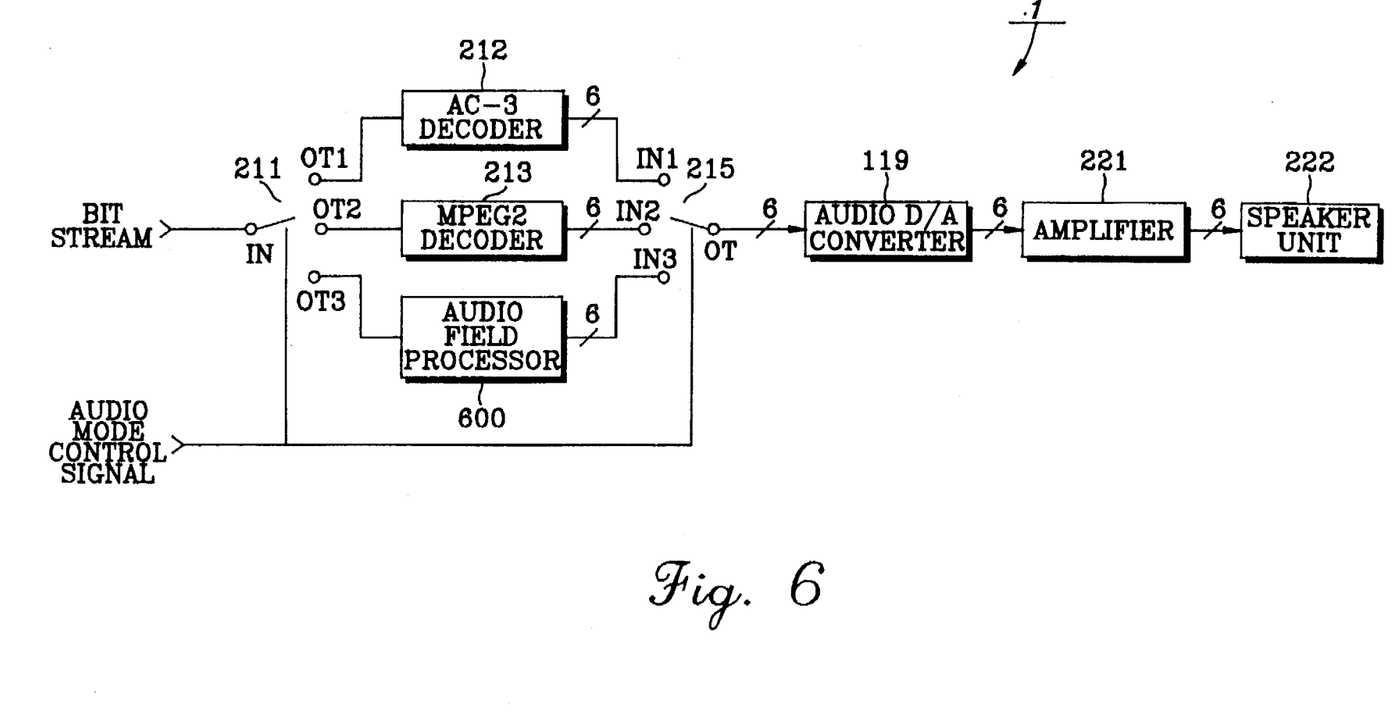
FIG. 6 is a block diagram of an audio decoder according to the present invention for use in the video disc driving system of FIG. 1.

FIG. 6 shows the structure of the audio decoder 118 according to the present invention, which includes a first switch 211 whose input port is connected to the audio bit stream output from the system decoder 115 and whose control port is connected to the audio mode control signal output from the controller 120. Also, the first output port of the first switch 211 is connected to the input port of the AC-3 decoder 212, and the second output port thereof is connected to the input port of the MPEG2 decoder 213, and the third output port thereof is connected to the input port of the audio field processor 600. Therefore, the first switch 211 switches the audio bit stream input by the audio mode control signal and outputs the same to the corresponding decoders 212, 213 and 600. The first switch 211 may be implemented by a multiplexer. In this case, the audio mode control signal applied as the selection signal of the multiplexer is a 2-bit signal.

The AC-3 decoder 212 extends the data encoded by the AC-3 compression format output from the first output port of the first switch 211 into the original data and outputs the same as 6-channel audio data. The MPEG2 decoder 213 extends the data encoded by the MPEG2 audio format output from the second output port of the first switch 211 into the original data and outputs the same as 6-channel audio data. An audio field processor 600 separates a linear PCM audio data of non-compressed two channels output from the third output port of the first switch 211 and then audio-field processes the 2-channel audio data and extends the audio-field processed data into the six-channel audio data to then be output. Here, the 6-channel audio signal includes an LFE-channel audio signal, C-channel audio signal, L-channel audio signal, R-channel audio signal, LS-channel audio signal, and RS-channel audio signal. Also, the 2-channel audio signal includes an L-channel audio signal and an R-channel audio signal.

The input port of the second switch 215 is connected to the output port of the AC-3 decoder 212, the second input port thereof is connected to the output port of the MPEG2 decoder 213, and the third input port thereof is connected to the output port of the audio field processor 600. The second switch 215 switches the audio signal applied to the first through third input ports by the audio mode control signal output from the controller 120 and selectively outputs the switched signal to the output port thereof.

First, the controller 120 determines an audio mode depending on the kind of data decoded in the system decoder 115. At this time, the audio mode may be classified into an AC-3 mode, MPEG2 mode and a PCM mode in accordance with the encoding used for compressing the audio signal recorded onto a video disc. Also, the controller 120 outputs an audio mode control signal for reproducing the audio data in accordance with the audio mode set by the decoding data of the system decoder 115. At this time, if the first switch 211 is a multiplexer and the second switch 215 is a demultiplexer, the controller 120 outputs audio mode control signals as shown in Table 1.

TABLE 1

| Audio mode | 1st Switch | 2nd Switch | Decoder |
| --- | --- | --- | --- |
| 00 | connected to first input port | connected to first output port | Select AC-3 decoder |
| 01 | connected to second input port | connected to second output port | Select MPEG2 decoder |
| 10 | connected to third input port | connected to third output port | Select audio-field processor |
| 11 | Reserved | Reserved | Reserved |

First, if the AC-3 audio mode is set by the system decoder 115, the controller 120 outputs an audio mode control signal of "00". If the audio mode control signal of "00" is output to the controller 120, the input port and the first output port are connected in the first switch 211 and the first input port and output port are connected in the second switch 215. Therefore, the AC-3 decoder 212 of the audio decoder 118 is selected. Then, the AC-3 decoder 212 extends to restore the compressed bit stream of the 6-channel audio data selectively output from the first switch 211 into the original 6-channel audio data. At this time, the AC-3 decoder 212 performs decoding according to the AC-3 format proposed by the Dolby Lab, as stated above. The bit stream of the AC-3 format includes system information such as header data in addition to the pure compressed audio data, which allows the AC-3 decoder 212 to perform the separation and control of the system information.

The 6-channel audio data output from the AC-3 decoder 212 is input to an audio D/A converter 119 via the second switch 215. Then, the audio D/A converter 119 converts the 6-channel audio data into a 6-channel analog audio signal and outputs the same. An amplifier 221 amplifies the 6-channel analog audio signal and outputs the same. Then, a speaker unit 222 having six speakers arranged in the same manner as shown FIG. 5 receives each audio signal corresponding to the six channels and reproduces the same.

Secondly, if the MPEG2 audio mode is set by the system decoder 115, the controller 120 outputs an audio mode control signal of "01". If the audio mode control signal of "01" is output to the controller 120, the input port and the second output port are connected in the first switch 211 and the second input port and output port are connected in the second switch 215. Therefore, the MPEG2 decoder 213 of the audio decoder 118 is selected. Then, the MPEG2 decoder 213 extends to restore the compressed bit stream of the 6-channel audio data selectively output from the first switch 211 into the original 6-channel audio data. At this time, the MPEG2 audio stream received through the first switch 211 is in the format proposed by the MPEG and the structure of its bit stream complies with "ISO/IEC 13818-3".

The operation which follows reception of the MPEG audio stream is the same as that as stated above.

Thirdly, if the PCM audio mode is set by the system decoder 115, the controller 120 outputs an audio mode control signal of "10". If the audio mode control signal of "10" is output by the controller 120, the input port and the third output port are connected in the first switch 211 and the third input port and output port are connected in the second switch 215. Therefore, the audio field processor 600 of the audio decoder 118 is selected. At this time, the PCM audio data is non-compressed linear audio data and has a 2-channel bit stream structure, that is, the L- and R-channels. The audio field processor 600 multiplexes the 2-channel non-compressed linear PCM audio data and field-processes the same to artificially extend the processed data into the 6-channel audio data.

Figure 7:
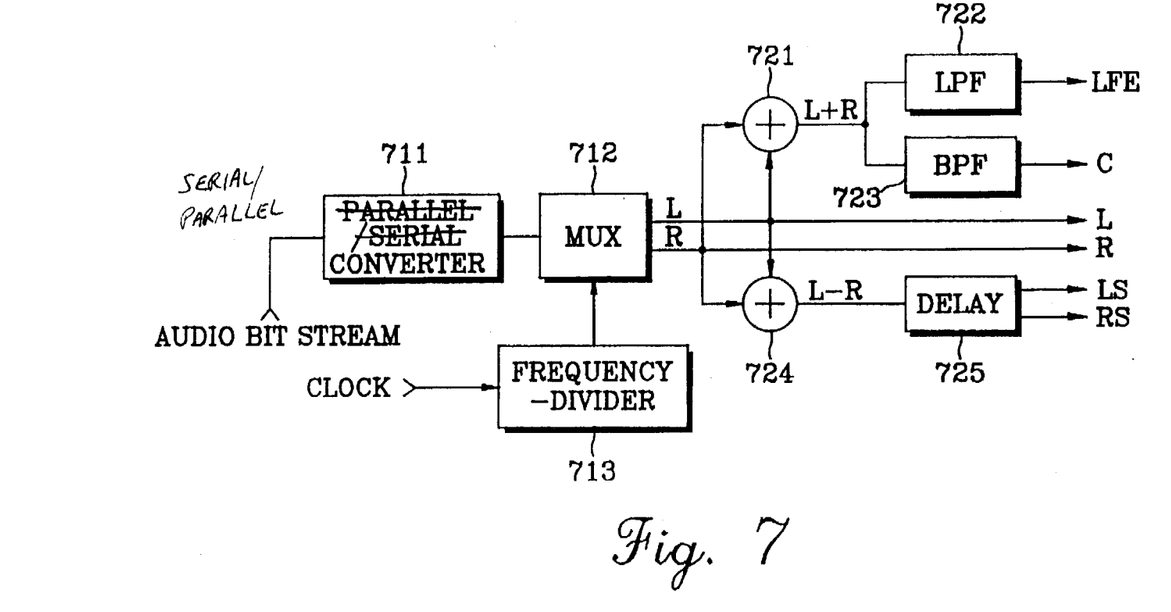
FIG. 7 is a block diagram of an audio field processor for processing a PCM audio signal according to the present invention for use in the audio decoder of FIG. 6.

The audio field processor 600 may be constructed as shown in FIG. 7. The non-compressed linear PCM audio bit stream has a structure such that 16-bit audio data of the L channel and 16-bit audio data of the R channel are seriated. Thus, a serial-to-parallel converter 711 converts the linear PCM audio data of the input bit stream format into 16-bit parallel linear PCM audio data. A frequency-divider 713 frequency-divides a bit clock to generate a selection signal converted in a 16-bit cycle. Then, a multiplexer 712 selectively outputs the L-channel audio data and the R-channel audio data from the parallel linear PCM audio data by the selection signal output from the frequency-divider 713. Therefore, the multiplexer 712 receives the linear PCM data composed of L- and R-channel data, filters such data into the L- and R-channel data and outputs the same.

An adder 721 adds the L-channel PCM audio data with the R-channel audio data. A lowpass filter 722 receives the output of the adder 722 and lowpass-filters the added L- and R-channel audio data by a first predetermined frequency. At this time, the first frequency becomes a low band signal of about 100 Hz. Therefore, the audio data output from the lowpass filter 722 is a low band audio signal of 100 Hz or below. A low-band sound such as beat is filtered from the LFE-channel audio data. A bandpass filter 723 receives the output of the adder 722 and bandpass-filters the added audio data ranging between the first predetermined frequency and second frequency. At this time, the first frequency is set to 100 Hz and the second frequency is set to 1 KHz~5 KHz. Therefore, the bandpass-filtered signal output from the bandpass filters 723 is the C-channel audio data and becomes a voice band signal.

Figure 8:
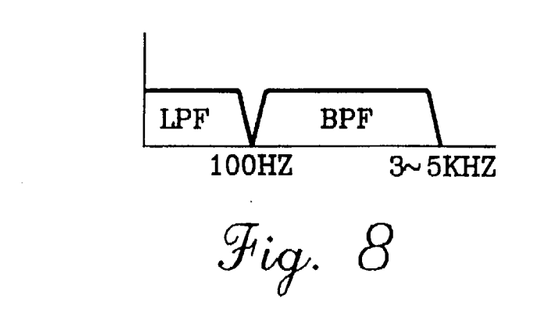
FIG. 8 is a waveform diagram showing filtering characteristics of a lowpass filter and the bandpass filter in FIG. 7.

The lowpass filter 722 and bandpass filter 723 have the filtering characteristics of the audio signal as shown in FIG. 8. At this time, the audio signal of 100 Hz or below becomes mainly a lowband musical sound and the audio signal ranging from 100 Hz to 1 KHz~5 KHz is a voice band. Therefore, the LFE-channel audio signal is a low-pitched musical sound and the C-channel audio signal is a voice.

A subtracter 724 subtracts the R-channel audio data from the L-channel audio data. A delay 725 receives the subtracted L- and R-channel audio data output from the subtracter 724, delays the same by a predetermined time and then outputs the delayed data as the LS- and RS-channel audio data. Therefore, the respective LS- and RS-channel audio data are the same and are delayed by a predetermined time, compared to the L-, R-, LFE- and C-channel audio data, to then be reproduced.

Now, the operation of audio-field processing the 2-channel non-compressed PCM audio data and extending the same into the 6-channel audio data will be described. Virtual LFE-, C-, LS- and RS-channel audio data are generated from the input L- and R-channel audio data. The C- and LFE-channel audio signal are obtained from a sum signal of the L- and R-channel audio data. At this time, if the speakers for six channels are arranged as shown in FIG. 5, the L- and R-channels audio signals output from the multiplexer 712 are applied to the L- and R-channel speakers, respectively. The LFE-channel audio signal output from the lowpass filter 722 is applied to the LFE-channel speaker. The C-channel audio signal of output from the bandpass filter 713 is applied to the C-channel speaker. Also, the LS- and RS-channel audio signals output from the delay 725 are applied to the LS- and RS-channel speakers, respectively. In this case, the 2-channel PCM audio data recorded onto a disc is extended into 6-channel audio data to then be reproduced.

The audio field processor 600 shown in FIG. 7 for receiving L and R-channel signals and reproducing a multitude of audio field signals may be implemented in different ways than that shown in FIG. 7.

Therefore, it should be understood that the present invention is not limited to the particular embodiment disclosed herein as the best mode contemplated for carrying out the present invention, except as defined in the appended claims.

What is claimed is:

1. An audio signal processor for selecting and processing an audio signal of one mode selected from an AC-3 mode, an MPEG2 mode and a PCM mode in a digital video disc player system for recording and an audio signal encoded in one format selected from a AC-3 format, an MPEG2 format and a PCM format and a video signal of an MPEG format, said processor comprising:

first switching unit whose input port is connected to an audio bit stream and switched by an audio mode control signal for outputting an audio signal of the AC-3 format to a first output port, outputting an audio signal of the MPEG2 format to a second output port and outputting a PCM audio signal to a third output port;

an AC-3 decoding unit connected to said first output port of said first switching unit for extending input compressingly encoded 6-channel audio data of said AC-3 format and then restoring the same into first 6-channel audio data;

an MPEG2 decoding unit connected to said second output port of said first switching unit for extending input compressingly encoded audio data of said MPEG2 format and then restoring the same into second 6-channel audio data;

a PCM processing unit connected to said third output port of said first switching unit for audio-field processing input 2-channel linear PCM audio data and then converting said 2-channel linear PCM audio data into third 6-channel audio data;

a second switching unit having a first input port connected to said AC-3 decoding unit, a second input port connected to said MPEG2 decoding unit and a third input port connected to said PCM processing unit, said second switching unit being switched by said audio mode control signal to selectively output audio signals of said first through third input ports to an output port;

a unit connected to said second switching unit for converting and outputting the audio signals output by said second switching unit into a 6-channel analog audio signal; and a unit having six speakers for reproducing said 6-channel analog signal.

2. An audio signal processor for selecting and processing an audio signal of one mode selected from an AC-3 mode, an MPEG2 mode and a PCM mode in a digital video disc player system for recording and an audio signal encoded in one format selected from a AC-3 format, an MPEG2 format and a PCM format and a video signal of an MPEG format, said processor comprising:

first switching unit whose input port is connected to an audio bit stream and switched by an audio mode control signal for outputting an audio signal of the AC-3 format to a first output port, outputting an audio signal of the MPEG2 format to a second output port and outputting a PCM audio signal to a third output port;

an AC-3 decoding unit connected to said first output port of said first switching unit for extending input compressingly encoded 6-channel audio data of said AC-3 format and then restoring the same into first 6-channel audio data;

an MPEG2 decoding unit connected to said second output port of said first switching unit for extending input compressingly encoded audio data of said MPEG2 format and then restoring the same into second 6-channel audio data;

a PCM processing unit connected to said third output port of said first switching unit for audio-field processing input 2-channel linear PCM audio data and then converting the same into third 6-channel audio data;

a second switching unit having a first input port connected to said AC-3 decoding unit, a second input port connected to said MPEG2 decoding unit and a third input port connected to said PCM processing unit, said second switching unit being switched by said audio mode control signal to selectively output audio signals of said first through third input ports to an output port;

a unit connected to said second switching unit for converting and outputting the audio signals output by said second switching unit into a 6-channel analog audio signal; and a unit having six speakers for reproducing said 6-channel analog signal, wherein said PCM processing unit comprises:

a unit for receiving an audio data stream, filtering first channel audio data and second channel audio data from said audio data stream and outputting the filtered first channel audio data and the second channel audio data to said third output port of said second switching unit;

a unit for adding said first and second channel audio data to produce added data;

a unit for subtracting said second channel audio data from said first channel audio data to produce subtracted data;

a unit for lowpass-filtering said added data to a first frequency or below to generate a third channel audio signal which is output to said third output port of said second switching unit;

a unit for bandpass-filtering said added data from said first frequency to a second frequency of an audible band to generate a fourth channel audio signal which is output to said third output port of said second switching unit; and a unit for delaying said subtracted data by a predetermined time to generate fifth and sixth channel audio signals which are output to said third output port of said second switching unit.

3. An audio signal processor for a digital video disc player system as claimed in claim 2, wherein said first frequency is 100 Hz of a beat sound band and said second frequency is a high-pass frequency of an audible sound band ranging from 3 KHz to 5 KHz.

4. An audio field processing unit for extending channels of a PCM audio data composed of first and second channels of a stereo signal, said audio field processing unit comprising:

a unit for receiving a PCM audio data stream, and filtering first channel audio data and second channel audio data from said audio data stream;

a unit for adding said first channel audio data and said second channel audio data to produce added data;

a unit for subtracting said second channel audio data from said first channel audio data to produce subtracted data;

a unit for lowpass-filtering said added data to a first frequency or below to generate a third channel audio signal;

a unit for bandpass-filtering said added data from said first frequency to a second frequency of an audible band to generate a fourth channel audio signal; and a unit for delaying said subtracted data by a predetermined time to generate fifth and sixth channel audio signals; and a unit having six speakers for reproducing said first through sixth channel audio signals.

5. An audio field processing unit for extending a PCM audio data as claimed in claim 4, wherein said first frequency is 100 Hz of a beat sound band and said second frequency is a high-pass frequency of an audible sound band ranging from 3 KHz to 5 KHz.

6. An audio field processing method for extending channels of PCM audio data composed of first and second channels of a stereo signal, said method comprising the steps of:

receiving a PCM audio data stream and filtering first channel audio data and second channel audio data from said audio data stream;

adding said first channel audio data and said second channel audio data to produce added data;

subtracting said second channel audio data from said first channel audio data to produce subtracted data;

lowpass-filtering said added data to a first frequency or below to generate a third channel audio signal;

bandpass-filtering said added data from said first frequency to a second frequency of an audible band to generate a fourth channel audio signal; and delaying said subtracted data by a predetermined time and to generate fifth and sixth channel audio signals; and applying said first through sixth audio signals to six speakers each corresponding to said signals for reproducing said first through sixth channel audio signals as a surround sound.

7. An audio field processing method for extending a PCM audio data as claimed in claim 6, wherein said first frequency is 100 Hz of a beat sound band and said second frequency is a high-pass frequency of an audible sound band ranging from 3 KHz to 5 KHz.

* * * * *